(12) United States Patent
Westfechtel et al.

(10) Patent No.: US 6,610,811 B1
(45) Date of Patent: *Aug. 26, 2003

(54) POLYURETHANES WITH IMPROVED TEAR PROPAGATION RESISTANCE

(75) Inventors: Alfred Westfechtel, Hilden (DE); Roland Gruetzmacher, Wuelfrath (DE); Rainer Hoefer, Duesseldorf (DE)

(73) Assignee: Henkel Kommanditgesellschaft auf Aktien, Duesseldorf (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 70 days.

(21) Appl. No.: 09/379,938

(22) Filed: Aug. 24, 1999

Related U.S. Application Data

(63) Continuation of application No. 08/793,345, filed as application No. PCT/EP95/03155 on Aug. 9, 1995, now abandoned.

(30) Foreign Application Priority Data

Aug. 18, 1994 (DE) .......................................... 44 29 345

(51) Int. Cl.⁷ .............................. C08J 3/00; C08K 3/20; C08L 75/00; C08G 18/00; C08G 18/32

(52) U.S. Cl. .......................... 528/44; 524/589; 524/590; 528/60; 528/65; 528/66; 528/77; 528/80; 528/81; 528/83; 528/84; 528/85

(58) Field of Search .................................. 524/589, 590; 528/44, 60, 65, 66, 77, 80, 81, 83, 84, 85

(56) References Cited

U.S. PATENT DOCUMENTS

| | | | | |
|---|---|---|---|---|
| 4,264,743 A | | 4/1981 | Maruyama et al. ......... 521/101 |
| 5,176,956 A | * | 1/1993 | Jevne et al. ................ 128/640 |

FOREIGN PATENT DOCUMENTS

| | | |
|---|---|---|
| EP | 0 240 698 A1 | 10/1987 |
| EP | 0 776 343 | 6/1997 |
| GB | 1131885 * | 10/1968 |
| GB | 1134172 * | 11/1968 |
| GB | 1 316 495 | 5/1970 |
| GB | 1 317 707 | 5/1970 |
| JP | 01 110527 A | 4/1989 |
| JP | 03 124719 A | 5/1991 |

OTHER PUBLICATIONS

Notice of Opposition and Opposition Papers of Unichema Chemie BV against EP 0 776 343 B1.
Derwent Patent Abstract (WPAT) No. 91–198564/27.
Derwent Patent Abstract (WPAT) No. 89–169336/23.

* cited by examiner

Primary Examiner—Patrick D. Niland
(74) Attorney, Agent, or Firm—John E. Drach; Henry E. Millson, Jr.

(57) ABSTRACT

Polyurethanes having improved tear resistance which are the reaction product of the following components:

A) a polyol component containing dimer diol and/or trimer triol and/or an OH-terminated polyester produced from polycarboxylic acids, preferably dimer fatty acid and/or trimer fatty acid, and diols and B) an isocyanate component containing prepolymers obtained by reacting polyfunctional isocyanates with dimer diol and/or trimer triol and/or an OH-terminated polyester produced from polycarboxylic acids, preferably dimer fatty acid and/or trimer fatty acid, and diols; and processes for their manufacture.

32 Claims, No Drawings

POLYURETHANES WITH IMPROVED TEAR PROPAGATION RESISTANCE

This application is a con of Ser. No. 08/793,345 Feb. 18, 1997 ABN which is a 371 of PCT/EP95/03155 Aug. 9, 1995.

FIELD OF THE INVENTION

This invention relates to polyurethanes with improved tear propagation resistance which contain dimer diol and/or trimer triol and/or a polyether containing dimer diol units and/or an OH-terminated polyester produced from polycarboxylic acids, preferably dimer fatty acid and/or trimer fatty acid, and diols.

PRIOR ART

Dimeric fatty alcohols (dimer diols) have been known for some time.

DE-A1 11 98 348, for example, describes their production by dimerization of unsaturated fatty alcohols with basic alkaline earth metal compounds at temperatures above 280° C.

They may also be obtained by hydrogenation of dimeric fatty acids and/or esters thereof in accordance with DE-B-17 68 313.

Another method of producing dimer diols comprises dimerizing unsaturated alcohols in the presence of silica/alumina catalysts and basic alkali metal compounds (cf. International patent application WO 91/13918).

A certain amount of trimerized fatty acid is always formed in the production of dimer fatty acid. This trimer fatty acid can be concentrated by removing the dimer fatty acid by distillation. After esterification with methanol for example, the esters of the trimer fatty acid—similarly to the esters of the dimer fatty acid—can be hydrogenated to trimer triol. This trimer triol, a trihydric alcohol containing 54 carbon atoms, may also be used in accordance with the present invention.

It is also known from unpublished German patent application P 43 16 245.2 that dimer diol can be condensed in the presence of an acid with elimination of water to form a polyether containing dimer diol units.

Polyurethanes containing dimer diol or trimer triol are also known.

The use of dimeric and trimeric fatty alcohols and mixtures thereof in the production of polyurethanes is known from DE-B1 11 79 660 which relates to the production of sulfur-containing elastic coating compositions.

It is also known that dimer diol can be used as a polyol for the production of polyurethane coatings by reaction with diisocyanates. Thus, DE-A1 12 25 795 describes polyurethane paints of dimeric and/or trimeric fatty alcohols containing an average number of 36 or 54 carbon atoms.

EP-B10 199 609 describes polyurethane adhesive layers produced from an NCO-terminated prepolymer based on polyester or polyether diols and dimer diol as chain-extending agent.

Polyurethane dispersions containing dimer diol and their use for stoving lacquers are described in DE-A1 42 37 965.

Unpublished German patent application P 43 08 100.2 describes casting resins of which the hydrolysis stability is improved by the addition of dimer diol.

The problem addressed by the present invention was to provide polyurethanes having improved tear propagation resistance.

It has surprisingly been found that polyurethanes containing dimer diol, trimer triol or dimer fatty acid or trimer fatty acid units show excellent tear propagation resistance.

DESCRIPTION OF THE INVENTION

The present invention relates to polyurethanes having improved tear propagation resistance which are produced from A) a polyol component containing dimer diol and/or trimer triol and/or a polyether containing dimer diol units and/or an OH-terminated polyester produced from polycarboxylic acids, preferably dimer fatty acid and/or trimer fatty acid, and diols and B) an isocyanate component containing prepolymers obtainable by reacting polyfunctional isocyanates with dimer diol and/or trimer triol and/or a polyether containing dimer diol units and/or an OH-terminated polyester produced from polycarboxylic acids, preferably dimer fatty acid and/or trimer fatty acid, and diols, at least one of components A or B containing dimer or trimer fatty acid or dimer or trimer fatty alcohol as a constituent.

The polyol component contains dimer diol and/or trimer triol and/or a polyether containing dimer diol units and/or an OH-terminated polyester produced from polycarboxylic acids, preferably dimer fatty acid and/or trimer fatty acid, and diols.

Irrespective of the processes described at the beginning for the production of the dimer diols, dimer diols produced from fatty acids or esters thereof or fatty alcohols containing 18 carbon atoms are preferably used. Dimer diols containing 36 carbon atoms are formed in this way. Dimer diols which have been produced by the industrial processes mentioned above always contain varying amounts of trimer triols and monohydric alcohols. In general, their percentage dimer diol content exceeds 70% by weight, the rest being trimer triols and monomer alcohols. Both these dimer diols and also purer dimer diols containing more than 90% by weight of dimer diol may be used in accordance with the present invention. Dimer diols containing more than 90 to 99% by weight of dimer diol are particularly preferred. Of these dimer diols, those with at least partly or completely hydrogenated double bonds are preferred.

Similarly to the esters of dimer fatty acid, the esters of trimer fatty acid may be hydrogenated to trimer triol. This trimer triol, a trihydric alcohol containing 54 carbon atoms, may also be used in accordance with the present invention. The trimer alcohol contains at least 50% by weight and preferably at least 65% by weight of trihydric alcohol.

The dimer diol or the trimer diol have hydroxyl values of 180 to 215 and preferably 200 to 210.

The polyethers containing dimer diol units may be produced in accordance with unpublished German patent application P 43 16 245.2 by acid-catalyzed polycondensation of suitable low molecular weight alkylene glycols at elevated temperature.

The polyethers containing dimer diol units have a hydroxyl value (OHV) of less than 175 and, more particularly, in the range from 10 to 100. The OH value expresses the quantity of KOH in mg which is equivalent to the quantity of acetic acid bound by 1 g of substance in the acetylation reaction.

The polyethers containing dimer diol units are liquid at room temperature (20° C.), i.e. they have a Brookfield viscosity at 25° C. of >3,000 mPas and, more particularly, in the range from 3,800 to 12,000 mPas.

The polyethers containing dimer diol units are hydrophobic, i.e. they are substantially insoluble in water at 20° C., preferably less than 1 mg and, more preferably, less than 0.1 mg dissolving in 100 ml of water.

Polyethers containing dimer diol units in the context of the invention also include the alkoxylation products of dimer diol or trimer triol which are obtainable by reaction of the hydroxyl groups of dimer diol or trimer triol with ethylene oxide, propylene oxide or butylene oxide. These polyethers may contain 1 to 20 and preferably 3 to 10 moles of alkylene oxide per mole of dimer diol or trimer triol.

Another embodiment is characterized by the use of OH-terminated polyesters obtained by esterification of polycarboxylic acids, preferably dimer or trimer fatty acid, with diols. Examples of suitable diols are ethylene glycol, diethylene glycol, propylene glycol, neopentyl glycol, hexane-1,6-diol and butane-1,4-diol.

In the reaction of dicarboxylic acids, particularly dimer fatty acid, with diols, the equivalent ratio of OH to COOH is generally between 1.4:1 and 3:1 and preferably between 1.8:1 and 2.2:1. In the reaction of tricarboxylic acids, particularly trimer fatty acid, with diols, the equivalent ratio of OH to COOH is generally between 2.5:1 and 4:1 and preferably between 2.7:1 and 3.3:1.

50 to 100% by weight and preferably 70 to 90% by weight of the polyol component of the polyurethanes according to the invention consists of dimer diol and/or trimer triol and/or a polyether containing dimer diol units and/or an OH-terminated polyester produced from polycarboxylic acids, preferably dimer fatty acid and/or trimer fatty acid, and diols, the rest consisting of another polyol typically encountered in polyurethane chemistry.

These other polyols may be polyether, polyester or oleochemical polyols or mixtures of these compounds. An overview of polyethers and polyesters typically encountered in polyurethane chemistry can be found, for example, in Ullmanns Enzyklopädie der technischen Chemie, 4th Edition, Vol. 19, Verlag Chemie, Weinheim, pages 304–5.

Examples of suitable hydroxyl-terminated polyesters are polyesters based on polycarboxylic acids, such as adipic acid, phthalic acid, maleic acid and azelaic acid, and diols, such as ethylene glycol, propylene glycol, neopentyl glycol, hexane-1,6-diol and butane-1,4-diol.

The polymeric reaction products of dimer or trimer fatty acids with polyhydric alcohols, for example ethylene glycol, propylene glycol, neopentyl glycol, hexane-1,6-diol and butane-1,4-diol, are also suitable.

Polycaprolactones and polycarbonates are preferred.

Examples of suitable hydroxyl-terminated polyethers are polyethylene glycol, polypropylene glycol and—preferably—polytetrahydrofuran.

Another group of preferred polyols are the oleochemical polyols.

Oleochemical polyols are understood to be polyols based on natural oils and fats, for example the reaction products of epoxidized fatty compounds with monohydric, dihydric or polyhydric alcohols or glycerol esters of long-chain fatty acids which are at least partly substituted by hydroxyl groups.

A subsidiary group of these compounds are the ring-opening products of epoxidized triglycerides, i.e. epoxidized fatty acid glycerol esters which have been ring-opened with the ester bonds intact. The ring-opening products may be produced from a number of epoxidized triglycerides of vegetable or animal origin. For example, epoxidized triglycerides containing 2 to 10% by weight of epoxide oxygen are suitable. Products such as these may be obtained from a number of fats and oils, for example beef tallow, palm oil, peanut oil, rapeseed oil, cottonseed oil, soybean oil, sunflower oil and linseed oil, by epoxidation of the double bonds. Particularly preferred epoxidized triglycerides are epoxidized soybean oil and epoxidized linseed oil.

Suitable alcohols for the ring-opening of the epoxidized triglycerides are methanol, ethanol, propanol, isopropanol, butanol, hexanol, 2-ethylhexanol, fatty alcohols containing 6 to 22 carbon atoms, cyclohexanol, benzyl alcohol, ethane-1,2-diol, propane-1,2-diol, propane-1,3-diol, butane-1,4-diol, hexane-1,6-diol, neopentyl glycol, trimethylol propane, glycerol, trimethylol ethane, pentaerythritol, sorbitol and hydroxy compounds containing ether groups, such as alkyl glycols, or oligomeric glycols and oligomeric glycerols.

The ring-opening reaction of epoxidized fatty acid esters or triglycerides with an alcohol may optionally be followed by transesterification with the starting material or with other triglycerides subsequently added, for example palm oil, peanut oil, rapeseed oil, cottonseed oil, soybean oil, sunflower oil and linseed oil. Corresponding oleochemical polyols are described, for example, in German patent application DE-A1 41 28 649.

Another group of oleochemical polyols are ring-opening and transesterification products of epoxidized fatty acid esters of lower alcohols, i.e. epoxidized fatty acid methyl, ethyl, propyl or butyl esters. The ring-opening or transesterification products with dihydric to tetrahydric alcohols are preferred, the reaction products with ethylene glycol, propylene glycol, oligomeric ethylene glycols, oligomeric propylene glycols, glycerol, trimethylol propane or pentaerythritol being particularly preferred. These products may be produced by known epoxidation or ring-opening methods, the transesterification optionally being carried out during or after the ring-opening step by removal of the lower alcohol from the reaction equilibrium. Preferred ring-opening and transesterification products are those where a molar ratio of epoxidized fatty acid ester to the alcohol used for the reaction of 1:1 to 1:10 has been applied.

The oleochemical polyols also include the reaction products of epoxidized fatty alcohols with $C_{2-8}$ alcohols having a functionality of 1 to 10 and, more particularly, 2 to 4, the molar ratio of the epoxide groups to the hydroxyl groups being 1:1 to 1:10.

Oleochemical polyols obtainable by the transesterification of dihydric or polyhydric alcohols, for example the adduct of ethylene oxide or propylene oxide with glycerol, with triglycerides, for example palm oil, peanut oil, rapeseed oil, cottonseed oil, soybean oil, sunflower oil and linseed oil, may also be used in accordance with the present invention.

The hydroxyl values of the other polyols as measured in accordance with DIN 53240 are in the range from 5 to 600, preferably in the range from 20 to 300 and more preferably in the range from 50 to 200.

The isocyanate component of the polyurethanes according to the invention contains an NCO-terminated prepolymer obtainable by reaction of polyfunctional isocyanates with dimer diol and/or trimer diol and/or a polyether containing dimer diol units and/or an OH-terminated polyester produced from a polycarboxylic acid, preferably a dimer fatty acid or trimer fatty acid, and diols.

The polyfunctional isocyanate has a functionality of 2 to 4 and preferably 2. Suitable polyfunctional isocyanates are both aromatic and aliphatic, monocyclic and polycyclic polyfunctional isocyanate compounds.

Examples of such polyfunctional isocyanates are toluene 2,4-diisocyanate, toluene 2,6-diisocyanate, diphenyl methane 4,4'-diisocyanate, m-xylylene diisocyanate, 3-isocyanatomethyl-3,5,5-trimethyl cyclohexyl isocyanate, 1,6-hexane diisocyanate, naphthylene 1,5-diisocyanate and toluene 2,4,6-triisocyanate.

Diphenyl methane 4,4'-diisocyanate is particularly preferred.

In the production of the prepolymers, the equivalent ratio of NCO to OH is generally between 6:1 and 1.5:1 and preferably between 3:1 and 2:1.

50 to 100% by weight and preferably 70 to 90% by weight of the isocyanate component of the polyurethanes according to the invention consists of the prepolymers.

Besides the prepolymers, the isocyanate component may also contain other polyfunctional isocyanate compounds. An overview of polyisocyanates typically used in polyurethane chemistry can be found, for example, in Ullmanns Enzyklopädie der technischen Chemie, 4th Edition, Vol. 19, Verdag Chemie, Weinheim, page 303.

Preferred polyisocyanates are aromatic diisocyanates, such as diphenyl methane diisocyanate or toluene diisocyanate and, in particular, technical diphenyl methane diisocyanate which contains isocyanates having a functionality of more than 2 and which is marketed, for example, under the name of Desmodur® VKS-H by Bayer AG.

In the production of the polyurethanes from components A and B, the equivalent ratio of NCO groups to OH groups (NCO:OH) is generally between 1.2:1 and 0.8:1 and preferably between 1.05:1 and 0.95:1.

In addition, the polyurethanes may contain various auxiliaries which are preferably incorporated in the polyol. Fillers, for example, may be used. Suitable fillers are inorganic compounds non-reactive to isocyanates, for example chalk or gypsum, precipitated silicas, zeolites, bentonites, ground minerals and other inorganic fillers known to the expert active in the field in question. Organic fillers, more particularly chopped fibers and others, may also be used. Fillers which make the polyurethanes thixotropic are preferred.

The polyurethanes according to the invention may also contain accelerators. Suitable accelerators are, for example, tertiary bases, such as bis-(N,N-dimethylamino)-diethyl ether, dimethylaminocyclohexane, N,N-dimethylbenzyl amine, N-methyl morpholine and the reaction products of dialkyl-(β-hydroxyethyl)-amine with monoisocyanates and esterification products of dialkyl-(β-hydroxyethyl)-amine and dicarboxylic acids. Another important accelerator is 1,4-diaminobicyclo-(2.2.2)-octane. Non-basic substances may also be used as accelerators. Examples of suitable non-basic accelerators are metal compounds, for example iron pentacarbonyl, iron acetyl acetonate and tin(II) (2-ethylhexoate), dibutyl tin dilaurate or molybdenum glycolate.

The polyurethanes according to the invention are produced by mixing components A and B. In general, this is done immediately before use, pending which the two components are stored separately in the absence of moisture.

In one preferred embodiment, the polyurethanes according to the invention have a tear propagation resistance according to DIN 53515 above 10 $Nmm^{-1}$ and, more particularly, above 15 $Nmm^{-1}$.

The polyurethanes according to the invention may be used as sealing compounds, for example in the electrical industry and in the building industry.

The polyurethanes according to the invention may also be used as adhesives and casting resins.

EXAMPLES

All percentages are by weight, unless otherwise indicated.
Starting compounds:
  Dimer diol—Sovermol® POL 900: OH value 203, dimer content>90%
  Trimer triol—Sovermol® POL 930: OH value 203, trimer content>50% by weight

Example 1

Production of the NCO-terminated Prepolymers

The quantity of polyol required for the theoretically calculated NCO value is added dropwise with stirring to a liquid polyisocyanate over a period of about 2 h at room temperature in an inert gas atmosphere. The reaction mixture is then heated at 80° C. until there is no further reduction in the NCO value. Prepolymers A to C were obtained in the same way.

1. Production of prepolymer A
   33.2% by weight of trimer triol
   66.8% by weight of diphenyl methane 4,4'-diisocyanate
   end product: 16.4% NCO
   Brookfield viscosity (25° C.): 8,240 mPa/s
2. Production of prepolymer B
   33.2% by weight of dimer diol
   66.8% by weight of diphenyl methane 4,4'-diisocyanate
   end product: 16.8% NCO
   Brookfield viscosity (25° C.): 2,270 mPa/s
3. Production of prepolymer C (Comparison Example)
   37.68% by weight of polypropylene glycol (PPG 1025, a DOW product, OH value 102)
   62.32% by weight of diphenyl methane 4,4'-diisocyanate
   end product: 17.0% NCO
   Brookfield viscosity (25° C.): 2,500 mPa/s

Example 2

General Procedure

The NCO-terminated prepolymers (A to C) prepared in accordance with Example 1 are cast in equimolar quantities with the following hydroxyl components with addition of 5% of zeolite (Baylith® L, Bayer AG) and the tear propagation resistance is measured in accordance with DIN 53515.

Polyurethanes 2 a–i listed in Table 1 were obtained in the same way.

TABLE 1

| Example | Prepolymer | Hydroxyl component | Tear propagation resistance according to DIN 53515 [$Nmm^{-1}$] |
|---|---|---|---|
| a | A | Trimer triol | 26.4 |
| b | B | Sovermol ® POL 900 | 18.4 |
| c | B | Dimer diol, 76% | 11.8 |
| d | B | Dimer diol, 68% | 6.4 |
| e | B | Sovermol ® 650 NS | 4.6 |
| f | B | Lin. polyester diol | 5.5 |
| g | A | Castor oil | 5.5 |
| h | C | Castor oil | 5.5 |
| i | C | Trimer triol | 6.3 |

The linear polyester diol is a polyester of diethylene glycol, neopentyl glycol, hexane-1,6-diol and adipic acid with an OH value of 60.

Sovermol® 650 NS is a dimer diol with a dimer content of 68% obtainable by the dimerization of unsaturated fatty alcohol.

Examples 2a to 2c correspond to the invention.

Examples 2d and 2e show that the tear propagation resistance decreases with the dimer content of the dimer diol.

Examples 2f to 2i show that particularly high tear propagation resistances are linked to the presence of dimer diol or trimer triol in the isocyanate component and the hydroxyl component.

What is claimed is:

1. A polyurethane which is a reaction product consisting of the following components:
   A) a polyol component, wherein the polyol component consists of from about 50 to about 90% by weight of at least one subcomponent selected from the group consisting of dimer diols, trimer triols, and OH-terminated polyesters, said OH-terminated polyesters consisting of polycarboxylic acid units and diol units, wherein the polycarboxylic acid units are dimer or trimer fatty acid units, and the balance of the weight of the polyol component consisting of at least one compound selected from the group consisting of polyethers, polyesters, and oleochemical polyols; and
   B) an isocyanate component, said isocyanate component consisting of a polyurethane prepolymer which is the reaction product of a polyfunctional isocyanate and at least one compound selected from the group consisting of dimer diols, trimer triols, polyethers containing dimer diol units, and OH-terminated polyesters, said OH-terminated polyesters consisting of polycarboxylic acid units and diol units;
   wherein the ratio of isocyanate groups in B) to hydroxyl groups in A) is from about 0.95:1 to about 1.05:1; and wherein the tear propagation resistance of the polyurethane is greater than 10 Nmm$^{-1}$.

2. A polyurethane which is a reaction product consisting of the following components:
   A) a polyol component, wherein the polyol component consists of from about 50% to 100% by weight of at least one subcomponent selected from the group consisting of dimer diols, trimer triols, and OH-terminated polyesters, said OH-terminated polyesters consisting of polycarboxylic acid units and diol units, wherein the polycarboxylic acid units are dimer or trimer fatty acid units, and wherein any balance of the weight of the polyol component consists of at least one compound selected from the group consisting of polyethers, polyesters, and oleochemical polyols; and
   B) an isocyanate component, said isocyanate component consisting of a polyurethane prepolymer which is the reaction product of a polyfunctional isocyanate and at least one compound selected from the group consisting of dimer diols, trimer triols, polyethers containing dimer diol units, and OH-terminated polyesters, said OH-terminated polyesters consisting of polycarboxylic acid units and diol units;
   wherein the ratio of isocyanate groups in B) to hydroxyl groups in A) is from about 0.95:1 to about 1.05:1; and wherein at least one of components A) and B) contains an OH-terminated polyester selected from the group consisting of adipic acid, phthalic acid, maleic acid, and azelaic acid.

3. The polyurethane of claim 2 wherein the polyfunctional isocyanate in component B) is an aromatic isocyanate.

4. The polyurethane composition of claim 3 wherein the aromatic isocyanate is diphenyl methane diisocyanate or toluene diisocyanate.

5. The polyurethane of claim 2 wherein the tear propagation resistance of the polyurethane is greater than 10 Nmm$^{-1}$.

6. The polyurethane of claim 5 wherein the said resistance is greater than 15 Nmm$^{-1}$.

7. A sealing composition comprised of the polyurethane of claim 2.

8. The polyurethane of claim 1 wherein in component A) the subcomponent is a dimer diol containing 36 carbon atoms.

9. The polyurethane of claim 2 wherein in component A) the subcomponent is a dimer diol containing 36 carbon atoms.

10. The polyurethane of claim 1 wherein in component A) the subcomponent is a trimer triol containing 54 carbon atoms.

11. The polyurethane of claim 2 wherein in component A) the subcomponent is a trimer triol containing 54 carbon atoms.

12. A polyurethane which is a reaction product comprised of the following components:
    A) a polyol component, wherein the polyol component consists of from about 50 to about 90% by weight of at least one subcomponent selected from the group consisting of dimer diols, trimer triols, and OH-terminated polyesters, said OH-terminated polyesters comprising polycarboxylic acid units and diol units, wherein the polycarboxylic acid units are dimer or trimer fatty acid units, and the balance of the weight of the polyol component consisting of at least one polyether compound which is an alkoxylation product of a dimer diol or a trimer triol containing from 1 to 20 moles of alkylene oxide per mole of dimer diol or trimer triol; and
    B) an isocyanate component, said isocyanate component comprising a polyurethane prepolymer comprising the reaction product of a polyfunctional isocyanate and at least one compound selected from the group consisting of dimer diols, trimer triols, polyethers containing dimer diol units, and OH-terminated polyesters, said OH-terminated polyesters comprising polycarboxylic acid units and diol units;
    wherein the ratio of isocyanate groups in B) to hydroxyl groups in A) is from about 0.95:1 to about 1.05:1.

13. A process for the manufacture of a polyurethane comprising reacting together the following components:
    A) a polyol component, wherein the polyol component consists of from about 50 to about 90% by weight of at least one subcomponent selected from the group consisting of dimer diols, trimer triols, and OH-terminated polyesters, said OH-terminated polyesters consisting of polycarboxylic acid units and diol units, wherein the polycarboxylic acid units are dimer or trimer fatty acid units, and the balance of the weight of the polyol component consisting of at least one compound selected from the group consisting of polyethers, polyesters, and oleochemical polyols; and
    B) an isocyanate component, said isocyanate component consisting of polyurethane prepolymer which is the reaction product of a polyfunctional isocyanate and at least one compound selected from the group consisting of dimer diols, trimer triols, polyethers containing dimer diol units, and OH-terminated polyesters, said OH-terminated polyesters consisting of polycarboxylic acid units and diol units;
    wherein the ratio of isocyanate groups in B) to hydroxyl groups in A) is from about 0.95:1 to about 1.05:1; and wherein the tear propagation resistance of the polyurethane is greater than 10 Nmm$^{-1}$.

14. The process of claim 13 wherein the polyol component consists of from about 70 to about 90% by weight of said at least one subcomponent.

15. The process of claim 13 wherein the polyfunctional isocyanate in component B) is an aromatic isocyanate.

16. The process of claim 13 wherein the said resistance is greater than 15 Nmm$^{-1}$.

17. The process of claim 13 wherein in component A) the subcomponent is a dimer diol containing 36 carbon atoms.

18. The process of claim 13 wherein in component A) the subcomponent is a trimer triol containing 54 carbon atoms.

19. A process for the manufacture of a polyurethane comprising reacting together reactants consisting of the following components:

A) a polyol component, wherein the polyol component consists of from about 50% to 100% by weight of at least one subcomponent selected from the group consisting of dimer diols, trimer triols, and OH-terminated polyesters, said OH-terminated polyesters consisting of polycarboxylic acid units and diol units, wherein the polycarboxylic acid units are dimer or trimer fatty acid units, and wherein any balance of the weight of the polyol component consists of at least one compound selected from the group consisting of polyethers, polyesters, and oleochemical polyols; and B) an isocyanate component, said isocyanate component consisting of a polyurethane prepolymer which is the reaction product of a polyfunctional isocyanate and at least one compound selected from the group consisting of dimer diols, trimer triols, polyethers containing dimer diol units, and OH-terminated polyesters, said OH-terminated polyesters consisting of polycarboxylic acid units and diol units;

wherein the ratio of isocyanate groups in B) to hydroxyl groups in A) is from about 0.95:1 to about 1.05:1; and wherein at least one of components A) and B) contains an OH-terminated polyester selected from the group consisting of adipic acid, phthalic acid, maleic acid, and azelaic acid.

20. The process of claim 19 wherein the polyol component consists of from about 70 to about 90% by weight of said at least one subcomponent.

21. The process of claim 19 wherein the polyfunctional isocyanate in component B) is an aromatic isocyanate.

22. The process of claim 21 wherein the aromatic isocyanate is diphenyl methane diisocyanate or toluene diisocyanate.

23. The process of claim 19 wherein the tear propagation resistance of the polyurethane is greater than 10 Nmm$^{-1}$.

24. The process of claim 23 wherein the said resistance is greater than 15 Nmm$^{-1}$.

25. The process of claim 19 wherein in component A) the subcomponent is a dimer diol containing 36 carbon atoms.

26. The process of claim 19 wherein in component A) the subcomponent is a trimer triol containing 54 carbon atoms.

27. A process for the manufacture of a polyurethane comprising reacting together reactants consisting of the following components:

A) a polyol component, wherein the polyol component consists of from about 50 to about 90% by weight of at least one subcomponent selected from the group consisting of dimer diols, trimer triols, and OH-terminated polyesters, said OH-terminated polyesters consisting of polycarboxylic acid units and diol units, wherein the polycarboxylic acid units are dimer or trimer fatty acid units, and the balance of the weight of the polyol component consisting of at least one compound selected from the group consisting of polyethers, polyesters, and oleochemical polyols; and B) an isocyanate component, said isocyanate component consisting of polyurethane prepolymer which is the reaction product of a polyfunctional isocyanate and at least one compound selected from the group consisting of dimer diols, trimer triols, polyethers containing dimer diol units, and OH-terminated polyesters, said OH-terminated polyesters consisting of polycarboxylic acid units and diol units;

wherein the ratio of isocyanate groups in B) to hydroxyl groups in A) is from about 0.95:1 to about 1.05:1.

28. The polyurethane of claim 1 wherein the polyol component consists of from about 70 to about 90% by weight of said at least one subcomponent.

29. The polyurethane of claim 1, wherein the polyfunctional isocyanate in component B) is an aromatic isocyanate.

30. The polyurethane composition of claim 29, wherein the aromatic isocyanate is diphenyl methane diisocyanate or toluene diisocyanate.

31. The polyurethane of claim 1 wherein the said resistance is greater than 15 Nmm$^{-1}$.

32. A sealing composition comprised of the polyurethane of claim 1.

* * * * *